United States Patent
Lazar et al.

(10) Patent No.: US 10,771,261 B1
(45) Date of Patent: Sep. 8, 2020

(54) EXTENSIBLE UNIFIED MULTI-SERVICE CERTIFICATE AND CERTIFICATE REVOCATION LIST MANAGEMENT

(71) Applicant: EMC IP Holding Company LLC, Hopkinton, MA (US)

(72) Inventors: Gregory W. Lazar, Upton, MA (US); Yi Fang, Sharon, MA (US); Gerald D. Jones, Medway, MA (US); Juhi Asthana, Hopkinton, MA (US); Jingyan Zhao, Harvard, MA (US); Mahadevan Vasudevan, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 15/279,813

(22) Filed: Sep. 29, 2016

(51) Int. Cl.
*H04L 9/32* (2006.01)
*H04L 9/14* (2006.01)
*H04L 9/30* (2006.01)
*H04L 29/06* (2006.01)

(52) U.S. Cl.
CPC ............ *H04L 9/3263* (2013.01); *H04L 9/14* (2013.01); *H04L 9/30* (2013.01); *H04L 9/3247* (2013.01); *H04L 9/3268* (2013.01); *H04L 63/06* (2013.01); *H04L 63/0823* (2013.01)

(58) Field of Classification Search
CPC ....... H04L 9/3263; H04L 9/3268; H04L 9/14; H04L 9/3247; H04L 63/0823; H04L 63/06
See application file for complete search history.

(56) References Cited

U.S. PATENT DOCUMENTS

| | | | | |
|---|---|---|---|---|
| 6,233,577 | B1 * | 5/2001 | Ramasubramani | ..... H04L 29/06 |
| 6,754,661 | B1 * | 6/2004 | Hallin | ..................... G06F 21/33 |
| | | | | 707/797 |
| 7,549,043 | B2 * | 6/2009 | Adams | ................ H04L 63/0442 |
| | | | | 709/206 |

(Continued)

OTHER PUBLICATIONS

I. A. Sukhodolskiy and S. V. Zapechnikov, "An access control model for cloud storage using attribute-based encryption," 2017 IEEE Conference of Russian Young Researchers in Electrical and Electronic Engineering (ElConRus), St. Petersburg, 2017, pp. 578-581, doi: 10.1109/ElConRus.2017.7910620. (Year: 2017).*

(Continued)

*Primary Examiner* — Kari L Schmidt
(74) *Attorney, Agent, or Firm* — BainwoodHuang

(57) ABSTRACT

Digital certificates for a set of multiple network services are maintained in a certificate store and managed through a single access point that provides access to the certificate store. The certificates are managed, at least in part by i) assigning one or more tags to each digital certificate in the set of digital certificates, one of the tags indicating a service in the set of services that uses the digital certificate to perform secure communications over the communication network, and ii) performing a set of certificate management operations through the single access point to the certificate store. At least one of the certificate management operations performed through the single access point selects a subset of the digital certificates from the set of digital certificates based at least in part on the tags assigned to the digital certificates.

19 Claims, 4 Drawing Sheets

(56) References Cited

U.S. PATENT DOCUMENTS

| | | | | |
|---|---|---|---|---|
| 8,195,934 | B1* | 6/2012 | Lawrence | H04L 63/0823 |
| | | | | 713/156 |
| 8,484,460 | B1* | 7/2013 | Vaughn | H04L 63/0823 |
| | | | | 713/155 |
| 8,549,300 | B1* | 10/2013 | Kumar | H04L 9/3247 |
| | | | | 713/153 |
| 9,100,190 | B1* | 8/2015 | Schwengler | H04L 9/3263 |
| 9,614,833 | B1* | 4/2017 | Rao | H04L 63/0823 |
| 9,954,848 | B1* | 4/2018 | Stoica | H04L 63/0823 |
| 10,547,457 | B1* | 1/2020 | Duccini | H04L 9/3268 |
| 2001/0044898 | A1* | 11/2001 | Benussi | H04L 63/0442 |
| | | | | 713/173 |
| 2002/0116647 | A1* | 8/2002 | Mont | G06F 21/33 |
| | | | | 726/6 |
| 2003/0014629 | A1* | 1/2003 | Zuccherato | H04L 9/3268 |
| | | | | 713/156 |
| 2003/0200437 | A1* | 10/2003 | Oishi | H04L 9/3013 |
| | | | | 713/175 |
| 2004/0255113 | A1* | 12/2004 | Ogura | H04L 63/062 |
| | | | | 713/156 |
| 2005/0027714 | A1* | 2/2005 | Kline | G06F 8/65 |
| 2005/0081029 | A1* | 4/2005 | Thornton | H04L 9/3271 |
| | | | | 713/156 |
| 2005/0289644 | A1* | 12/2005 | Wray | G06F 21/41 |
| | | | | 726/5 |
| 2007/0005956 | A1* | 1/2007 | Zilinskas | G06F 21/335 |
| | | | | 713/156 |
| 2008/0123855 | A1* | 5/2008 | Thomas | H04L 9/083 |
| | | | | 380/277 |
| 2008/0256358 | A1* | 10/2008 | Wilkie | G06F 21/33 |
| | | | | 713/156 |
| 2008/0301445 | A1* | 12/2008 | Vasic | G06F 21/6245 |
| | | | | 713/171 |
| 2009/0319783 | A1* | 12/2009 | Thornton | H04L 63/0823 |
| | | | | 713/156 |
| 2010/0146250 | A1* | 6/2010 | Bergerson | H04L 9/3073 |
| | | | | 713/1 |
| 2010/0161969 | A1* | 6/2010 | Grebovich | H04L 9/3265 |
| | | | | 713/156 |
| 2010/0235640 | A1* | 9/2010 | Satoh | H04L 9/083 |
| | | | | 713/169 |
| 2011/0087882 | A1* | 4/2011 | Kuo | G06F 21/57 |
| | | | | 713/156 |
| 2011/0126003 | A1* | 5/2011 | Engert | H04L 63/0823 |
| | | | | 713/156 |
| 2011/0154024 | A1* | 6/2011 | Ignaci | H04L 63/0823 |
| | | | | 713/156 |
| 2011/0202759 | A1* | 8/2011 | Hubbell | H04L 63/061 |
| | | | | 713/156 |
| 2011/0213961 | A1* | 9/2011 | Wnuk | H04L 63/062 |
| | | | | 713/156 |
| 2011/0213967 | A1* | 9/2011 | Wnuk | H04L 63/0823 |
| | | | | 713/158 |
| 2012/0210136 | A1* | 8/2012 | Haddad | H04L 63/065 |
| | | | | 713/176 |
| 2012/0221955 | A1* | 8/2012 | Raleigh | H04L 12/1485 |
| | | | | 715/736 |
| 2012/0240244 | A1* | 9/2012 | Orazi | G06F 21/62 |
| | | | | 726/29 |
| 2013/0212379 | A1* | 8/2013 | Dixon | H04L 9/3268 |
| | | | | 713/156 |
| 2014/0013105 | A1* | 1/2014 | Niemeyer | G06F 21/33 |
| | | | | 713/156 |
| 2014/0213217 | A1* | 7/2014 | Ho | H04L 63/105 |
| | | | | 455/411 |
| 2014/0258711 | A1* | 9/2014 | Brannon | H04L 9/006 |
| | | | | 713/156 |
| 2015/0089232 | A1* | 3/2015 | Belton | H04L 9/3268 |
| | | | | 713/175 |
| 2015/0281278 | A1* | 10/2015 | Gooding | H04L 63/14 |
| | | | | 726/1 |
| 2016/0057132 | A1* | 2/2016 | Gibson | H04L 63/0823 |
| | | | | 713/156 |
| 2016/0132682 | A1* | 5/2016 | Sudhakar | H04L 63/0823 |
| | | | | 713/2 |
| 2016/0366233 | A1* | 12/2016 | Le | H04L 41/0866 |
| 2017/0026240 | A1* | 1/2017 | Purusothaman | H04L 41/0853 |
| 2017/0171191 | A1* | 6/2017 | Cignetti | H04L 63/06 |
| 2020/0008062 | A1* | 1/2020 | Tian | H04W 12/06 |

OTHER PUBLICATIONS

M. Ates, S. Ravet, A. M. Ahmat and J. Fayolle, "An Identity-Centric Internet: Identity in the Cloud, Identity as a Service and Other Delights," 2011 Sixth International Conference on Availability, Reliability and Security, Vienna, 2011, pp. 555-560, doi: 10.1109/ARES.2011.85. (Year: 2011).*

Wallace, Carl, and Geoff Beier. "Practical and secure trust anchor management and usage." Proceedings of the 9th Symposium on Identity and Trust on the Internet. 2010, pp. 97-107. (Year: 2010).*

Cooper, et al., "Internet x.509 Public Key Infrastructure Certificate and Certificate Revocation List (CRL) Profile," RFC 5280, Standards Track, May 2008, pp. 1-135.

Kent, Steve, "Privacy Enhancement for Internet Electronic Mail: Part II: Certificate-Based Key Management," RFC 1422, Feb. 1993, pp. 1-32.

"PKCS #11 v2.20: Cryptrographic Token Interface Standard," RSA Laboratories, RSA Security, Inc., Jun. 28, 2004, pp. 1-407.

* cited by examiner

EXTENSIBLE UNIFIED MULTI-SERVICE CERTIFICATE AND CERTIFICATE REVOCATION LIST MANAGEMENT

BACKGROUND

As it is generally known, public-key cryptography uses key pairs, each of which consists of a public key that may be publically distributed and a corresponding private key which is privately held by the owner of the key pair. Public-key cryptography techniques include using the public key to verify that digitally signed messages originated with the holder of the corresponding private key, and/or using a public key to encrypt messages such that they can only be decrypted by the holder of the corresponding private key. Digital certificates (sometimes also referred to as "public key certificates") are used to verify that a particular public key belongs to a certain entity. One example of a digital certificate is defined by the X.509 standard, which specifies formats for digital certificates and certificate revocation lists. X.509 digital certificates are typically provided by a Certificate Authority (CA). Another example of a digital certificate is an "identity certificate" that may be provided by a trusted third party (a "trusted peer") through a web of trust, as defined in the Pretty Good Privacy (PGP) data encryption and decryption system.

Many secure communication protocols use public-key cryptography, and accordingly require digital certificates. Examples of protocols that use public-key cryptography include Secure Sockets Layer (SSL) and its successor Transport Layer Security (TLS), Secure Shell (SSH), Secure/Multipurpose Internet Mail Extensions (S/MIME), PGP, and Internet Key Exchange (IKE).

As more and more network services operate using secure network communications provided by protocols that use public-key cryptography, the number of digital certificates that must be stored and managed on computerized platforms that provide and/or use network services has also increased. Effective management of digital certificates and related certificate revocation lists that are maintained within a computerized platform is crucial to preventing interruption of such network services.

SUMMARY

Unfortunately, previous systems for managing digital certificates and related certificate revocation lists have exhibited significant shortcomings. For example, the techniques through which digital certificates have been stored and accessed have been service-specific. Accordingly, system administrator users responsible for the operation of computerized platforms providing or using multiple network services have had to understand the inner details of the design of each service that is installed on the platform in order to access and manage the complete set of digital certificates used by the platform as a whole. As a result, platform-wide certificate management, to monitor and effectively maintain the operational status of digital certificates used by multiple network services that are installed on a single platform, has been impractical or ineffective.

To address these and other shortcomings of previous systems, improved techniques are disclosed herein for managing the digital certificates that are used on a computerized platform. The disclosed techniques include installing a set of network services on the computerized platform, and maintaining a set of digital certificates on the platform. The set of digital certificates maintained on the platform are required by the network services to be stored on the platform, in order for the network services to perform secure communications over a communication network. The set of digital certificates are maintained on the platform in at least one certificate store that stores digital certificates used by network services installed on the platform.

The digital certificates maintained in the certificate store are managed through a single access point that provides access to all the certificates in the certificate store. One example of the single access point is an Application Program Interface (API). The set of digital certificates maintained in the certificate store are managed, at least in part by i) assigning one or more tags to each digital certificate in the set of digital certificates, one of the tags indicating a service in the set of services that uses the digital certificate to perform secure communications over the communication network, and ii) performing a set of certificate management operations through the single access point to the certificate store. At least one of the certificate management operations performed through the single access point selects a subset of the digital certificates from the set of digital certificates based on the tags assigned to the digital certificates.

In another aspect of the disclosed techniques, assigning tags to each digital certificate may specifically include assigning a service tag to the digital certificate. The service tag for a digital certificate indicates a service in the set of services that uses the digital certificate. Performing certificate management operations may then include receiving a query command that specifies a service and, in response to receiving the query command, performing a query operation that selects a subset of the digital certificates, the subset consisting of digital certificates with service tags having a value matching the service specified by the query command.

In another aspect of the disclosed techniques, assigning tags to each digital certificate may specifically include assigning a certificate type tag to each digital certificate. The certificate type tag indicates a type of the digital certificate. Performing the set of certificate management operations may then further include receiving a query command specifying a certificate type and, in response to receiving the query command, performing a query operation that selects a subset of digital certificates, the subset consisting of digital certificates with certificate type tags having a value matching the certificate type specified by the query command.

For example, the certificate type tag for a digital certificate may have a value of "Client", thus indicating that the digital certificate contains a public key of client entity.

In another example, the certificate type tag for a digital certificate may have a value of "Server", thus indicating that the digital certificate contains a public key of a server entity.

In another example, the certificate type tag may have a value of "Certificate Authority", thus indicating that the digital certificate contains a public key of a certificate authority.

In another example, the certificate type tag may have a value of "Trusted Peer", thus indicating that the digital certificate contains a public key of a trusted peer, as defined in the Pretty Good Privacy (PGP) data encryption and decryption system.

In another aspect of the disclosed techniques, assigning the tags to each digital certificate may include assigning a certificate scope tag to each digital certificate. The certificate scope tag indicates a scope of operation within which the digital certificate may be used. Performing the set of certificate management operations may then further include receiving a query command indicating a certificate scope and, in response to receiving the query command, performing a query operation that selects a subset of digital certificates consisting of digital certificates having certificate scope tags matching the certificate scope indicated by the received query command. The certificate scope tag may, for example, indicate a server or domain that defines a scope within which the digital certificate to which the tag is assigned may be used.

In another aspect of the disclosed techniques, performing the set of certificate management operations may further include receiving an import certificate command indicating a digital certificate and a set of tags and, in response to receiving the import certificate command, performing an import certificate operation that stores the digital certificate indicated by the import certificate command into the certificate store and assigns the set of tags indicated by the command to the digital certificate, e.g. within a certificate database or the like.

In another aspect of the disclosed techniques, performing the set of certificate management operations may further include receiving a create certificate command including or otherwise indicating a Subject attribute for the requested certificate, and optionally including or otherwise indicating an Alternative Subject Name attribute for the requested certificate. In response to receipt of the create certificate command, a public/private key pair is generated. A Certificate Signing Request (CSR) is then generated that contains the public key from the generated public/private key pair, as well as the Subject attribute, and the Alternative Subject Name attribute if one is provided in the command. A user (e.g. a system administrator user) then exports the CSR and sends it to the certificate authority. The certificate authority then uses the CSR to generate a digital certificate containing the public key and Subject attribute, and the Alternative Subject Name attribute if one is provided to the certificate authority in the CSR. The certificate authority then signs the digital certificate using the certificate authority's public key, and returns the signed digital certificate to the requesting user. The user then imports the received digital certificate into the certificate store such that the received digital certificate is associated with the private key of the public/private key pair that was generated in response to receipt of the create certificate command.

In another aspect of the disclosed techniques, performing the set of certificate management operations may further include receiving an export certificate command indicating a digital certificate stored in the certificate store, and, in response to receiving the export certificate command, performing an export certificate operation that outputs a copy of the digital certificate indicated by the export certificate command.

In another aspect of the disclosed techniques, performing the set of certificate management operations may further include receiving a delete certificate command indicating a digital certificate stored in the certificate store, and, in response to receiving the delete certificate command, performing a delete certificate operation that deletes all copies of the digital certificate stored on the platform.

In another aspect of the disclosed techniques, a set of certificate revocation lists may be maintained in the certificate store, each one of the certificate revocation lists including a list of digital certificates that have been revoked. The set of certificate revocation lists may then be managed through the single access point providing access to the certificate store. Managing the set of certificate revocation lists may include i) assigning one or more tags to each certificate revocation list in the set of certificate revocation lists, one of the tags indicating at least one service in the set of services that uses the certification revocation list, and ii) performing a set of certificate revocation list management operations through the single access point to the certificate store, at least one of the certificate revocation list management operations selecting a subset of the certificate revocation lists from the set of certificate revocation lists using the tags assigned to the certificate revocation lists.

Embodiments of the disclosed techniques may provide significant advantages over previous approaches. For example, the disclosed techniques enable centralized certificate management for computerized platforms that provide or use multiple network services. System administrator users responsible for the operation of a computerized platform as a whole may advantageously use the disclosed techniques to manage all digital certificates that are used by the computerized platform. As a result, platform-wide certificate management using the disclosed techniques can be effective in monitoring and maintaining all digital certificates used by multiple network services that are installed on a single platform, thus preserving the operational status of the network services that rely on secure communications provided using the digital certificates.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for managing digital certificates on a computerized platform described herein include installing a set of network services on the computerized platform. The computerized platform maintains, in at least one certificate store configured and arranged to store digital certificates that are used on the computerized platform, a set of digital certificates that are used by the network services, where each one of the network services requires that at least one of the digital certificates in the set of digital certificates be maintained on the computerized platform for the network service to perform secure communications over a communication network.

The set of digital certificates maintained in the certificate store are managed through a single access point that provides access to the certificate store. Managing the set of digital certificates maintained in the certificate store includes i) assigning one or more tags to each digital certificate in the set of digital certificates, one of the tags indicating at least one service that uses the digital certificate to perform secure communications over the communication network, and ii) performing a set of certificate management operations through the single access point to the certificate store, at least one of the certificate management operations selecting a subset of the digital certificates from the set of digital certificates using the tags assigned to the digital certificates.

Figure 1:
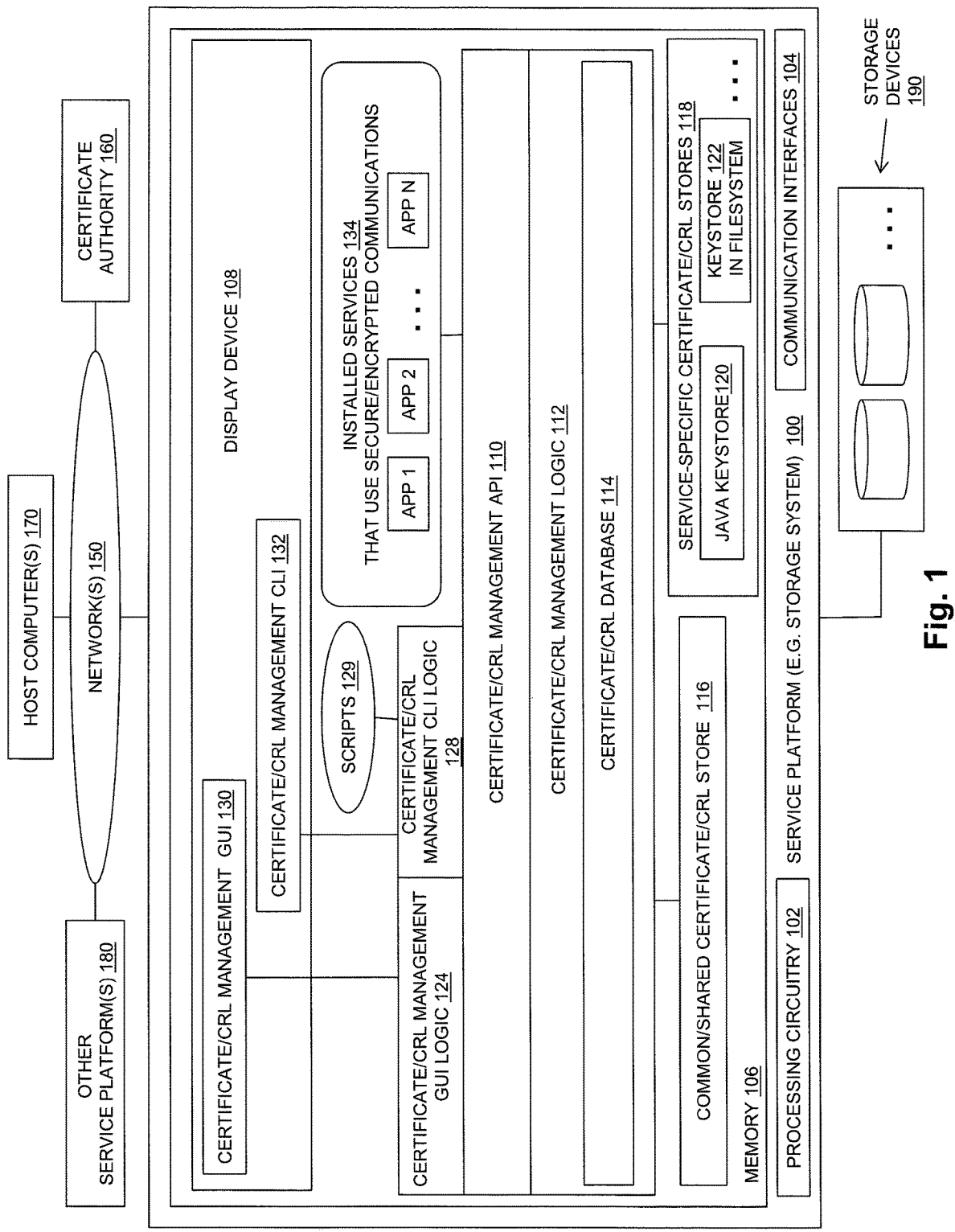
FIG. 1 is a block diagram showing an example of an operational environment including components of an embodiment of the disclosed techniques.

FIG. 1 is a block diagram showing an example of an operational environment including components of an embodiment of the disclosed techniques. As shown in FIG. 1, a Service Platform 100 is a computerized platform that includes Processing Circuitry 102, Communication Interfaces 104, Memory 106, and a Display Device 108. Processing Circuitry 102 may, for example, include or consist of one or more microprocessors, e.g. central processing units (CPUs), multi-core processors, chips, and/or assemblies, and associated circuitry. Communication Interfaces 104 enable the Service Platform 100 to communicate over Network(s) 150, and may include, for example, one or more network interface adapters for transmitting and/or receiving electronic and/or optical signals over Network(s) 150. Memory 106 may include volatile memory (e.g., RAM), and/or non-volatile memory, such as one or more ROMs, disk drives, solid state drives, and the like. Processing Circuitry 102 and Memory 106 within Service Platform 100 form electronic control circuitry, which is constructed and arranged to carry out various methods and functions as described herein. Memory 106 may store a variety of software components that may be provided in the form of executable program code. For example, as shown in FIG. 1, Memory 106 may include software components such as Certificate/CRL Management API 110, Certificate/CRL Management Logic 112, Certificate/CRL Database 114, Certificate/CRL Management GUI Logic 124, Certificate/CRL Management CLI Logic 128, and Installed Services 134. When the program code in Service Platform 100 is executed by Processing Circuitry 102, Processing Circuitry 102 may be caused to carry out the operations of the software components, and to carry out the methods and functions as described herein. Certificate/CRL Management API 110, Certificate/CRL Management Logic 112, Certificate/CRL Database 114, Certificate/CRL Management GUI Logic 124, Certificate/CRL Management CLI Logic 128, and/or Installed Services 134 may alternatively be embodied in whole or in part as firmware, microcode, and/or hardware circuitry operable to carry out the methods and functions described herein. Although certain software components are shown and described for purposes of illustration and explanation, those skilled in the art will recognize that Memory 106 may additionally or alternatively include various other software components, such as an operating system, and various other applications, processes, etc.

Network(s) 150 may consist of or include any specific type of communication network or networks, such as a local area network (LAN), and/or a wide area network (WAN) such as the Internet, etc. Display Device 108 may consist of or include any specific type of electronic display operable to present information in visual form.

In one example, Service Platform 100 may be embodied as a data storage system, used by Host Computers 170 to store and retrieve data on non-volatile Storage Devices 190. In such an embodiment, Storage Devices 190 may include magnetic disk drives, electronic flash drives, and/or optical drives, and Service Platform is additionally operable to service host I/O operations that arrive from Host Computer(s) 170, and that specify logical storage objects based on Storage Devices 190 that are to be written, read, created, or deleted. Further in such an embodiment, Service Platform 100 may include additional hardware and software (not shown) that receives and manages incoming host I/O operations, and that organizes and secures host data that is stored on Storage Devices 190 on behalf of the Host Computer(s) 170.

Certificate/CRL Management API 110 is operable to receive certificate commands from various components, including, for example, Certificate/CRL Management GUI Logic 124 that receives certificate commands from a graphical user interface shown by Certificate/CRL Management GUI 130, and/or Certificate/CRL Management CLI Logic 128 that receives certificate commands from a command-line interface shown by Certificate/CRL CLI 132 and from one or more system administration scripts, as shown by Scripts 129. Certificate commands may also be received by Certificate/CRL Management API 110 from one or more of the applications in Installed Services 134. The certificate commands received by Certificate/CRL Management API 110 may include, for example, an import certificate command for adding a digital certificate to Common/Shared Certificate Store 116 and/or Service-Specific Certificate/CRL Stores 118, a create certificate command for creating a digital certificate to be added to Common/Shared Certificate Store 116 and/or Service-Specific Certificate/CRL Stores 118, a certificate query command for querying the digital certificates stored in Common/Shared Certificate Store 116 and/or Service-Specific Certificate/CRL Stores 118 based on tags assigned to the digital certificates and/or other attributes of the digital certificates, an export certificate command for exporting a digital certificate stored in Common/Shared Certificate Store 116 and/or Service-Specific Certificate/CRL Stores 118, and/or a delete certificate command for deleting a digital certificate stored in Common/Shared Certificate Store 116 and/or Service-Specific Certificate/CRL Stores 118.

Certificate/CRL Management Logic 112 is operable to perform operations corresponding to the certificate commands received by Certificate/CRL Management API 110, e.g. using information contained in Certificate/CRL Database 114. For example, for each digital certificate stored in Common/Shared Certificate Store 116 and/or Service-Specific Certificate/CRL Stores 118, Certificate/CRL Database 114 may associate the tags that are assigned to that digital certificate with the digital certificate, as well as other attributes of the digital certificate, in order to support certificate operations performed by Certificate/CRL Management Logic 112 in response to receipt of corresponding certificate commands by Certificate/CRL Management API 110. As further described below, the tags that may be assigned to each digital certificate stored in Common/Shared Certificate Store 116 and/or Service-Specific Certificate/CRL Stores 118 may include a service tag, a certificate type tag, and/or a certificate scope tag.

During operation of the example shown in FIG. 1, network services are installed on the Service Platform 100, shown for purposes of illustration by applications APP 1, APP 2, through APP N in Installed Services 134. The Installed Services 134 may, for example, include any specific application program that provides or uses a service over Network(s) 150, and that uses a communication protocol based on public-key cryptography to securely communicate over Network(s) 150, e.g. with Host Computer(s) 170, Other Service Platform(s) 180, and/or a Certificate Authority 160. Each application in Installed Services 134 thus requires that at least one digital certificate be stored on Service Platform 100. For example, Installed Services 134 may include one or more applications that securely communicate over Network(s) 150 using communication protocols such as Secure Sockets Layer (SSL)/Transport Layer Security (TLS), Secure Shell (SSH), Secure/Multipurpose Internet Mail Extensions (S/MIME), PGP, and/or Internet Key Exchange (IKE). Installed Services 134 may include any specific type of application that communicates using a protocol based on public-key cryptography to provide secure communications over Network(s) 150. Examples of applications that may be present in Installed Services 134 include without limitation i) virtual computer data storage software, such as vStorage APIs for Storage Awareness (VASA), provided by VMware, Inc., of Palo Alto Calif., which may be used by Service Platform 100 to provide virtual volume storage objects (VVOLs) to Host Computer(s) 170, ii) Web server software used to store, process and deliver Web pages to clients, iii) software for managing and accessing a distributed directory information service, such as Lightweight Directory Access Protocol (LDAP) software, and/or iv) software that manages and accesses cryptographic keys on a key management server, such as Key Management Interoperability Protocol (KMIP) software. Each one of the applications in Installed Services 134 may be i) a server entity that provides a service over Network(s) 150, e.g. to one or more client entities running on Host Computer(s) 170 and/or Other Service Platforms 180, or ii) a client entity that uses a service provided by a server entity running on Host Computer(s) 170 and/or Other Service Platforms 180. Each of the applications in Installed Services 134 may, for example, be installed on Service Platform 100 by applications management software provided in an operating system, and/or application-specific installation software provided with the application.

The Certificate/CRL Management Logic 112 maintains digital certificates that are required for secure communications by Installed Services 134 in at least one certificate store that is configured and arranged to store such digital certificates in the computerized platform, as shown in the example of FIG. 1 by Common/Shared Certificate Store 116 and/or Service-Specific Certificate/CRL Stores 118. Common/Shared Certificate Store 116 is a repository of digital certificates that may be used to store digital certificates that are not required to be stored in Service-Specific Certificate/CRL Stores 118. Some applications in the Installed Services 134 may require that the digital certificates they use be stored in Service-Specific Certificate/CRL Stores 118. For example, an application in Installed Services 134 may require that the digital certificate(s) it uses to communicate securely over Network(s) 150 be stored in Java KeyStore 120. In another example, an application in the Installed Services 134 may require that the digital certificate(s) it uses to communicate securely over Network(s) 150 be stored in a specific file and/or folder in a filesystem of Service Platform 100, as shown by KeyStore 122.

The digital certificates maintained in Common/Shared Certificate/CRL Store 116 and/or Service-Specific Certificate Stores 118 are managed through a single access point on Service Platform 100 that provides access to Common/Shared Certificate/CRL Store 116 and/or Service-Specific Certificate Stores 118, as shown in the example of FIG. 1 by Certificate/CRL Management API 110. Management of the certificates maintained in Common/Shared Certificate/CRL Store 116 through Certificate/CRL Management API 110 includes assigning one or more tags to each digital certificate stored in Common/Shared Certificate/CRL Store 116 and/or Service-Specific Certificate/CRL Stores 118. The tags assigned to each digital certificate stored in Common/Shared Certificate/CRL Store 116 and/or Service-Specific Certificate/CRL Stores 118 include at least one tag indicating at least service in the Installed Services 134 that uses the digital certificate to perform secure communications over Network(s) 150.

Management of the certificates maintained in Common/Shared Certificate/CRL Store 116 through Certificate/CRL Management API 110 also includes performing a set of certificate management operations through Certificate/CRL Management API 110. The set of certificate management operations performed through Certificate/CRL Management API 110 includes at least one management operation that selects a subset of digital certificates stored in Common/Shared Certificate/CRL Store 116 and/or Service-Specific Certificate/CRL Stores 118, using at least one of the tags assigned to the digital certificates.

For example, assigning tags to each digital certificate may include assigning a service tag to the digital certificate. A service tag assigned to a digital certificate has a value indicating one of the Installed Services 134 that uses the digital certificate to perform secure communications over Network(s) 150. The value of the service tag for a given digital certificate may, for example, include or consist of a text name of a service in Installed Services 134 that uses the digital certificate to perform secure communications over Network(s) 150.

Performing at least one of the certificate management operations may include receiving, by the Certificate/CRL Management API 110, a query command indicating a service, e.g. by the text name of the service. In response to receiving such a query command, Certificate/CRL Management API 110 passes the text name of the application from the query command to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, the subset consisting of those digital certificates stored in Common/Shared Certificate/CRL Store 116 and/or Service-Specific Certificate/CRL Stores 118 that have assigned service tags with values that match the text name of the service from the query command. For example, in response to a query command containing a service name of "KMIP", Certificate/CRL Management Logic 112 would perform a query operation that selects those digital certificates stored in Common/Shared Certificate/CRL Store 116 and/or Service-Specific Certificate/CRL Stores 118 that have service tag values matching the application name "KMIP". In this way, for example, all digital certificates stored in the Service Platform 100 that are used by a given service (e.g. the KMIP application) to securely communicate over Network(s) 150, may be obtained by performing a single query command.

In another example, assigning tags to each digital certificate may include assigning at least one certificate type tag to the digital certificate. Each certificate type tag assigned to a digital certificate may include a value indicating the type of the digital certificate. The value of the certificate type tag for a given digital certificate may, for example, include or consist of a text certificate type. Examples of certificate types include without limitation i) "Client", which is assigned to each digital certificate that contains a public key of a client entity in Installed Services 134, ii) "Server", which is assigned to each digital certificate that contains a public key of a server entity in Installed Services 134, iii) "Certificate Authority", which is assigned to each digital certificate that contains a public key of a certificate authority, and/or iv) "Trusted Peer", which is assigned to each digital certificate that contains a public key of trusted peer, as defined in the Pretty Good Privacy (PGP) data encryption and decryption system.

Performing a certificate management operation may include receiving, by the Certificate/CRL Management API 110, a query command indicating a specific certificate type, e.g. by way of a text certificate type contained in the query command. In response to receiving such a query command, Certificate/CRL Management API 110 passes the certificate type indicated by the query command to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the sub set consists of digital certificates stored in Common/Shared Certificate/CRL Store 116 and/or Service-Specific Certificate/CRL Stores 118 that have assigned certificate type tags with values that match the certificate type indicated by the query command.

For example, in response to receiving a query command indicating a certificate type of "Client", Certificate/CRL Management API 110 passes the certificate type of "Client" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate type tag with a value of "Client", and that accordingly each contain a public key of a client entity, e.g. a client entity installed in Installed Services 134.

In another example, in response to receiving a query command indicating a certificate type of "Server", Certificate/CRL Management API 110 passes the certificate type of "Server" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate type tag with a value of "Server", and that accordingly each contain a public key of a server entity, e.g. a server entity installed in Installed Services 134.

In another example, in response to receiving a query command indicating a certificate type of "Certificate Authority", Certificate/CRL Management API 110 passes the certificate type of "Certificate Authority" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate type tag with a value of "Certificate Authority", and that accordingly each contain a public key of a certificate authority.

In another example, in response to receiving a query command indicating a certificate type of "Trusted Peer", Certificate/CRL Management API 110 passes the certificate type of "Trusted Peer" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate type tag with a value of "Trusted Peer", and that accordingly each contain a public key of a trusted peer, as defined in the Pretty Good Privacy (PGP) data encryption and decryption system.

Assigning tags to each digital certificate may include assigning at least one certificate scope tag to the digital certificate. Each certificate scope tag assigned to a digital certificate may include a value indicating a scope within which the digital certificate may be used to provide secure communications. For example, the value of the certificate scope tag for a given digital certificate may, for example, include or consist of a text string identifying the scope within which the digital certificate may be used. Examples of certificate scopes include without limitation i) a server name, e.g. a name of a server entity executing in Service Platform 100, in one of Host Computer(s) 170, or in Other Service Platform(s) 180), with which secure communications may be performed using the digital certificate, or ii) a domain name, e.g. a name of a domain within which secure communications may be performed using the digital certificate, such as an LDAP domain or the like within which secure communications may be performed using the digital certificate.

Performing a certificate management operation may include receiving, by the Certificate/CRL Management API 110, a query command indicating a specific certificate scope, e.g. by way of a text certificate scope in the query command. In response to receiving the query command, Certificate/CRL Management API 110 passes the certificate scope indicated by the query command to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have assigned certificate scope tags with values that match the certificate type indicated by the query command.

For example, in response to receiving a query command indicating a certificate scope of "Server-100", Certificate/CRL Management API 110 passes the certificate scope of "Server-100" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate type tag with a value of "Server-100", and that accordingly can only be used to perform secure communications that involve "Server-100", e.g. between a server named "Server-100" on Service Platform 100 and one or more client entities on Host Computer(s) 170.

In another example, in response to receiving a query command indicating a certificate scope of "foobar.com", Certificate/CRL Management API 110 passes the certificate scope of "foobar.com" to Certificate/CRL Management Logic 112, causing Certificate/CRL Management Logic 112 to perform a query operation that selects a subset of the digital certificates stored in Common/Shared Certificate/CRL Store 116 and/or Service-Specific Certificate/CRL Stores 118, where the subset consists of digital certificates stored in Common/Shared Certificate/CRL Store 116 and/or Service-Specific Certificate/CRL Stores 118 that have an assigned certificate scope tag with a value of "foobar.com", and that accordingly can only be used for secure communications related to the domain "foobar.com", e.g. for LDAP requests related to or referring to the domain "foobar.com".

While the above examples describe using requested values for individual tags in certificate query commands, query commands may be provided that indicate requested values for multiple tags. For example, a query command may indicate a first requested value for the service tag, a second requested value for the type tag, and a third requested value for the scope tag, and the subset of digital certificates selected when the corresponding query operation is performed would consist of digital certificates with service tags that match the first request value, type tags that match the second requested value, and scope tags that match the third requested value.

The subset of digital certificates selected by a query operation may, for example, be displayed through the Certificate/CRL Management CLI 132 or Certificate/CRL Management GUI 130.

Performing at least one of the certificate management operations may include receiving, by the Certificate/CRL Management API 110, an import certificate command indicating a digital certificate (e.g. by a filename of a file containing the digital certificate within a file directory in Service Platform 100), and one or more tag values to be associated with the digital certificate in Certificate/CRL Database 114. The import certificate command may alternatively or additionally indicate a location at which the digital certificate is or must be stored, e.g. a location within Java KeyStore 120 or KeyStore 122 at which the digital certificate must be stored so that it can be accessed by one or more of the services in Installed Services 134. In response to receiving such an import certificate command, Certificate/CRL Management API 110 passes the indication of the digital certificate, the tag values and any required certificate location to Certificate/CRL Management Logic 112, causing Certificate/CRL Management Logic 112 to perform an import certificate operation that assigns the tag values to the digital certificate, e.g. by creating an entry or object for the digital certificate in Certificate/CRL Database 114 to store at least the tag values, such that the digital certificate can subsequently be retrieved based on the tag values through query operations performed by Certificate/CRL Management Logic 112 using Certificate/CRL Database 114. Further during the import certificate operation Certificate/CRL Management Logic 112 may store other attributes of the digital certificate into the entry or object for the digital certificate in Certificate/CRL Database 114. Such other attributes may, for example, include information such as attributes of X.509 certificates, including for example Serial Number (a unique identifier for the certificate), Subject (the person or entity identified), Signature Algorithm (an algorithm used to create the signature), Signature (digital signature of issuer), Issuer (the entity that issued the certificate), Valid-From (the date the certificate is first valid from), Valid-To (the date the certificate expires), Key-Usage (how the public key is used), Public-Key (the public key), and others, such that the digital certificate can also be retrieved based on these additional attributes through query operations performed by Certificate/CRL Management Logic 112 using Certificate/CRL Database 114. Additionally during the import certificate operation Certificate/CRL Management Logic 112 may load the entry or object for the digital certificate in Certificate/CRL Database 114 with a location within Common/Shared Certificate/CRL Store 116 or Service-Specific Certificate/CRL Stores 118 at which the digital certificate is stored.

Performing at least one of the certificate management operations may include receiving, by the Certificate/CRL Management API 110, a create certificate command including or otherwise indicating a Subject attribute for the requested certificate, and optionally including or otherwise indicating an Alternative Subject Name attribute for the requested certificate. In response to receiving the create certificate command, Certificate/CRL Management API 110 passes the Subject attribute and Alternative Subject Name attribute (if received with the create certificate command) to Certificate/CRL Management Logic 112, causing Certificate/CRL Management Logic 112 to perform a create certificate operation that i) generates a public/private key pair, and then ii) generates a Certificate Signing Request (CSR) that contains the public key from the generated public/private key pair, and the Subject attribute, and the Alternative Subject Name attribute (if received with the create certificate command). An administrator user then exports the CSR and sends it to the certificate authority. The certificate authority then uses the CSR to generate a digital certificate a digital certificate containing the public key and Subject attribute, and the Alternative Subject Name attribute if one is provided to the certificate authority in the CSR. The certificate authority then signs the digital certificate using the certificate authority's public key, and returns the signed digital certificate to the requesting administrator user. The administrator user then imports the received digital certificate into either Common/Shared Certificate/CRL Store 116 or Service-Specific Certificate/CRL Stores 118, such that the received digital certificate is associated with the private key of the public/private key pair that was generated in response to receipt of the create certificate command. For example, the Subject Attribute and/or Alternative Subject Name attribute, and/or one or more other tags, may be assigned to the obtained digital certificate, e.g. by creating an entry or object for the digital certificate in Certificate/CRL Database 114 to store the tags and other attributes of the obtained certificate, such that the digital certificate can subsequently be retrieved based on the tag values and/or other attributes through query operations performed by Certificate/CRL Management Logic 112 using Certificate/CRL Database 114.

Performing at least one of the certificate management operations may include receiving, by the Certificate/CRL Management API 110, an export certificate command indicating a digital certificate stored in Common/Shared Certificate/CRL Store 116 or Service-Specific Certificate/CRL Stores 118 that is to be exported, e.g. by some unique identifier such as a serial number of the digital certificate. In response to receiving the export certificate command, Certificate/CRL Management API 110 passes the indication of the digital certificate that is to be exported to Certificate/CRL Management Logic 112, causing Certificate/CRL Management Logic 112 to perform an export certificate operation that retrieves and outputs a copy of the digital certificate indicated by the export certificate command. The output copy of the digital certificate may then be passed to an entity within the Service Platform 100 that issued the export certificate command, such as one of the Installed Services 132, in order to set up secure communications over Network(s) 150 (e.g. to set up secure communications over Network(s) 150 using SSL/TSL).

Performing at least one of the certificate management operations may include receiving, by the Certificate/CRL Management API 110, a delete certificate command indicating a digital certificate stored in Common/Shared Certificate/CRL Store 116 or Service-Specific Certificate/CRL Stores 118 that is to be deleted, e.g. by some unique identifier attribute such as a serial number of the digital certificate. In response to receiving the delete certificate command, Certificate/CRL Management API 110 passes the indication of the digital certificate that is to be deleted to Certificate/CRL Management Logic 112, causing Certificate/CRL Management Logic 112 to perform a delete certificate operation that deletes all copies of the indicated digital certificate from Common/Shared Certificate/CRL Store 116 or Service-Specific Certificate/CRL Stores 118, and also any entry or object representing the digital certificate from Certificate/CRL Database 114.

The query, import, create, export and delete commands received by Certificate/CRL Management API 110 may also be received for certificate revocation lists, causing corresponding certificate revocation list operations to be performed by Certificate/CRL Management Logic 112. Each certificate revocation list includes a list of digital certificates that have been revoked by the certificate authority that issued them. Certificate revocation lists may accordingly be stored in Common/Shared Certificate Store 116 and/or Service-Specific Certificate Stores 118, and tags may be assigned to such certificate revocation lists by way of entries or objects in Certificate/CRL Database 114. In this way, certificate revocation lists maintained in Common/Shared Certificate/CRL Store 116 and/or Service-Specific Certificate Stores 118 may also be managed through the single access point on Service Platform 100 that provides access to Common/Shared Certificate/CRL Store 116 and/or Service-Specific Certificate Stores 118, e.g. through Certificate/CRL Management API 110. Management of the certificate revocation lists maintained in Common/Shared Certificate/CRL Store 116 through Certificate/CRL Management API 110 may include assigning one or more tags to each certificate revocation list that is stored in Common/Shared Certificate/CRL Store 116 and/or Service-Specific Certificate/CRL Stores 118. The tags assigned to each certificate revocation list stored in Common/Shared Certificate/CRL Store 116 and/or Service-Specific Certificate/CRL Stores 118 may include at least one tag indicating at least service in the Installed Services 134 that uses the certificate revocation list to identify revoked digital certificates.

Management of the certificate revocation lists maintained in Common/Shared Certificate/CRL Store 116 through Certificate/CRL Management API 110 may also include performing a set of certificate revocation list management operations through Certificate/CRL Management API 110. The set of certificate revocation list management operations performed through Certificate/CRL Management API 110 may include at least one management operation that selects a subset of the certificate revocation lists stored in Common/Shared Certificate/CRL Store 116 and/or Service-Specific Certificate/CRL Stores 118, using at least one of the tags assigned to the certificate revocation lists.

Figure 2:
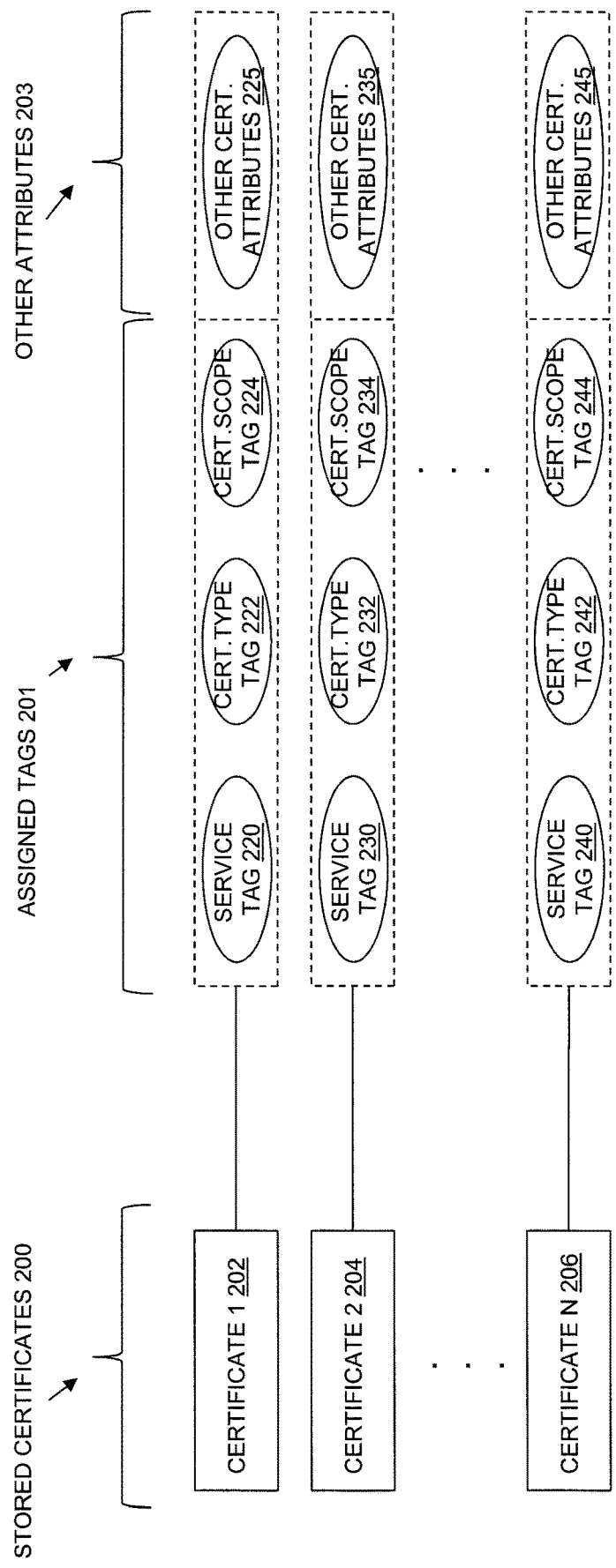
FIG. 2 is a block diagram illustrating the assignment of tags to digital certificates in an embodiment of the disclosed techniques.

FIG. 2 is a block diagram further illustrating the assignment of tags to digital certificates in an embodiment of the disclosed techniques. In FIG. 2, digital certificates that are stored on a service platform, such as Service Platform 100 of FIG. 1, are shown by Stored Certificates 200, and include Certificate 1 202, Certificate 2 204, through Certificate N 206. Each one of the digital certificates in Stored Certificates 20 may be assigned its own i) service tag indicating a service that uses the certificate, ii) certificate type tag indicating the type of the certificate, and iii) certificate scope tag indicating a scope within which the certificate may be used. Accordingly, Certificate 1 202 is assigned Service Tag 220, Certificate Type Tag 222, and Certificate Scope Tag 224, Certificate 2 204 is assigned Service Tag 230, Certificate Type Tag 232, and Certificate Scope Tag 234, and so on through Certificate N 206, which is assigned Service Tag 240, Certificate Type Tag 242, and Certificate Scope Tag 244. The Assigned Tags 201 may be associated with the Stored Certificates 200 through a certificate database or the like, such as Certificate/CRL Database 114 shown in FIG. 1, that enables sets of digital certificates to be retrieved based on their tags in response to certificate query commands issued to a single point of access to the certificate store on the service platform.

In addition, the certificate database may be used to associate Other Attributes 203 with each of the Stored Certificates 200. In the example of FIG. 2, Certificate 1 202 is associated with Other Certificate Attributes 225, Certificate 2 204 is associated with Other Certificate Attributes 235, and so on through Certificate N 206, which is associated with Other Certificate Attributes 245. Other certificate attributes that may be associated with each digital certificate may include attributes of X.509 certificates (e.g. Serial Number, Subject, Signature Algorithm, Signature, Issuer, Valid-From, Valid-To, Key-Usage, Public-Key, and others). In this way, the disclosed certificate database may enable sets of digital certificates to be retrieved additionally based the values of their other attributes in response to certificate query commands issued to a single point of access to the certificate store on the service platform.

Figure 3:
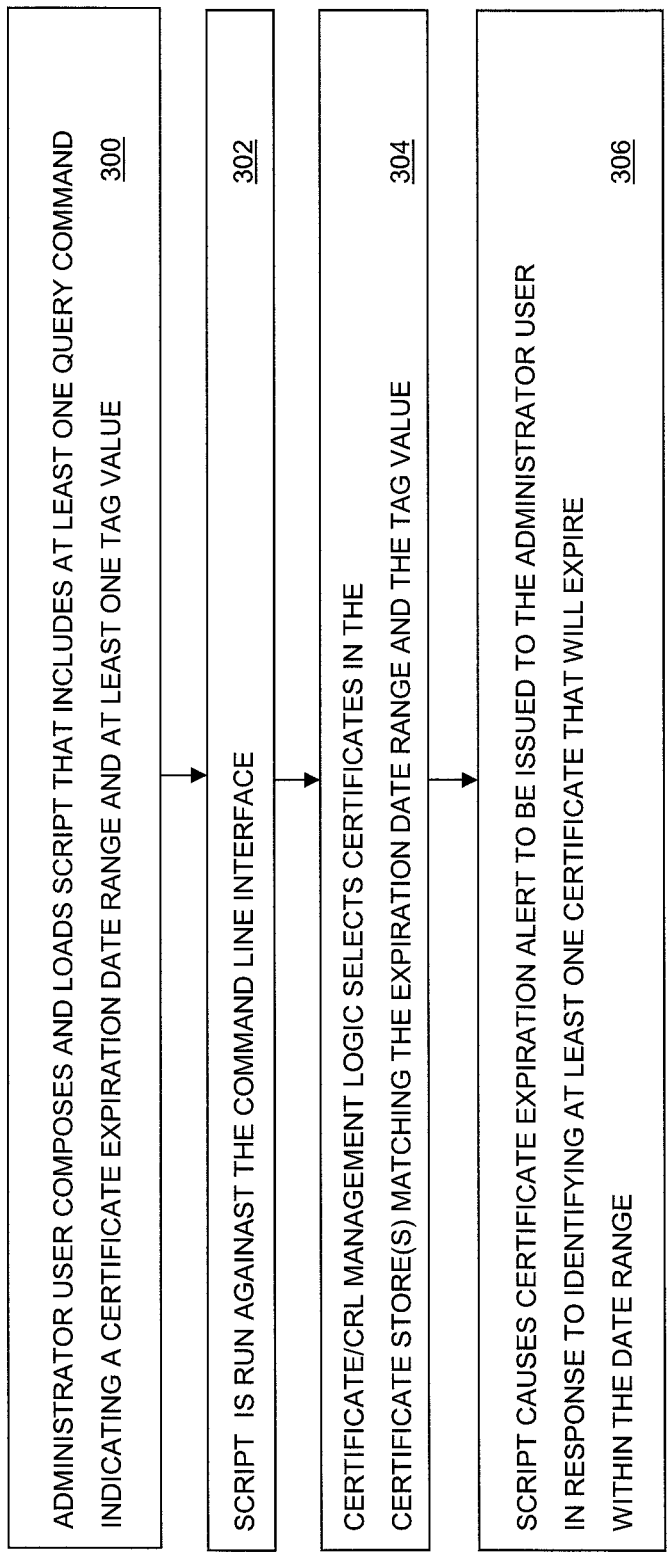
FIG. 3 is a flow chart illustrating an example of how expiration dates of digital certificates may advantageously be checked based on tags and/or other certificate attributes using an embodiment of the disclosed techniques.

FIG. 3 is a flow chart illustrating an example of how expiration dates of digital certificates used by an individual server may advantageously be checked based on tags and/or other certificate attributes using an embodiment of the disclosed techniques. As show in FIG. 3, at step 300 a system administrator user composes and loads a script (e.g. one of Scripts 129 shown in FIG. 1) to be run against a command-line interface (e.g. Certificate/CRL Management CLI Logic 128 shown in FIG. 1). The script includes at least one query command indicating a certificate expiration date range and at least one tag value. For example the script may include a query requesting digital certificates that have expiration dates (e.g. Valid-To dates) occurring within some upcoming time period (e.g. within the next thirty days), and that have a service tag value of "KMIP". Such a script requests the return of all digital certificates stored on the service platform that are used to provide secure communications for the KMIP service, and that have expiration dates occurring within the next thirty days.

At step 302, the script is run against the command-line interface, and the query command in the script is passed to and received by the single point of access (e.g. Certificate/CRL Management API 110 shown in FIG. 1). Such a script may, for example, be run periodically in order to identify specific digital certificates that are about to expire, prior to their expiration.

At step 304, in response to receipt of the query command at step 302, certificate/CRL management logic (e.g. Certificate/CRL Management Logic 112) performs a query operation across all digital certificates stored in the service platform (e.g. all digital certificates stored in Common/ Shared Certificate/CRL Store 116 and/or Service-Specific Certificate/CRL Stores 118), and selects a subset of digital certificates consisting of only those digital certificates stored in the service platform that a) have expiration dates within the next thirty days, and b) have service tag values of "KMIP". The selected digital certificates may be displayed as an output to the system administrator user, e.g. through Certificate/CRL Management CLI 132 in Display Device 108 of Service Platform 100, enabling the system administrator user to initiate procedures for renewing the returned digital certificates prior to their expiration.

In addition, at step 306, in response to identifying at least one digital certificate used by the KMIP service that will expire within the data range, the script may cause a certificate expiration alert to be issued to the system administrator user, e.g. through a notification channel such as electronic mail, text message, certificate/CRL management GUI, etc.

In this way an embodiment of the disclosed techniques may centrally manage certificate expiration times, through a single access point, across the entire set of certificates stored on the service platform, within a subset of certificates that is selected based on the value of one of the tags assigned to the digital certificates.

Figure 4:
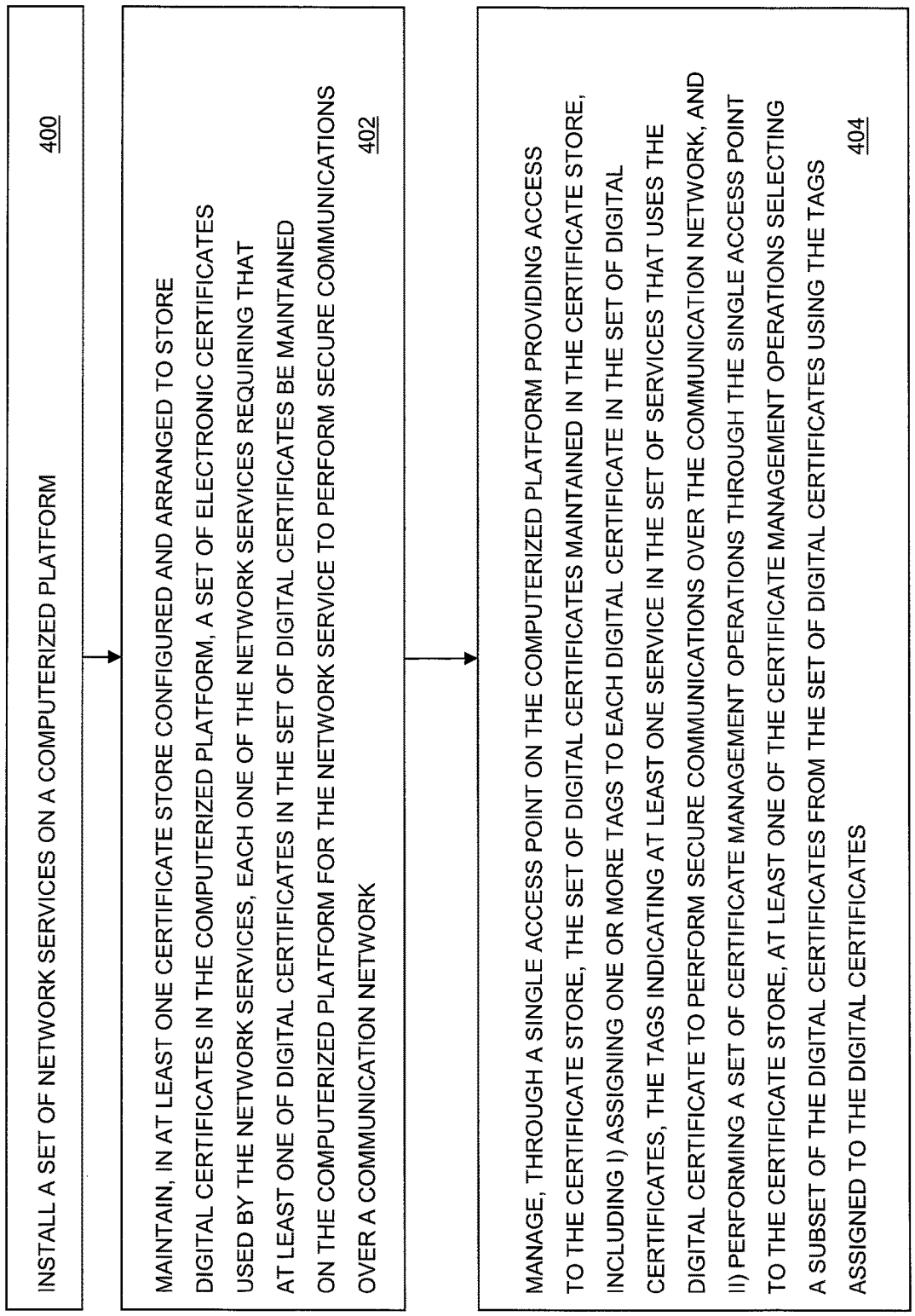
FIG. 4 is a flow chart illustrating steps performed to manage digital certificates on a computerized platform in accordance with an embodiment of the disclosed techniques.

FIG. 4 is a flow chart illustrating steps performed to manage digital certificates on a computerized platform in accordance with an embodiment of the disclosed techniques. As shown in FIG. 4, at step 400 a set of network services are installed on a computerized platform. At step 402, a set of digital certificates are maintained in the computerized platform, in at least one certificate store configured and arranged to store digital certificates. The set of digital certificates maintained in the computerized platform are used by the network services to perform secure communications over at least one communication network. Accordingly, each one of the network services requires that at least one of digital certificates in the set of digital certificates be maintained on the computerized platform in order for the network service to perform secure communications over the communication network.

At step 404, the set of digital certificates maintained in the certificate store are managed through a single access point on the computerized platform that provides access to the certificate store. Managing the digital certificates maintained in the certificate store includes i) assigning one or more tags to each digital certificate in the set of digital certificates, one of the assigned tags indicating at least one service in the set of services that uses the digital certificate to perform secure communications over the communication network, and ii) performing a set of certificate management operations through the single access point to the certificate store, at least one of the certificate management operations selecting a subset of the digital certificates from the set of digital certificates using the tags assigned to the digital certificates.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of managing digital certificates on a computerized platform, the method comprising:

installing, by processing circuitry of the computerized platform, a set of network services on the computerized platform, each one of the network services in the set of network services comprising an application program executing in the computerized platform that performs secure communications over a communication network that is connected to the computerized platform;

maintaining, by the processing circuitry, in at least one certificate store configured and arranged to store digital certificates and certificate revocation lists in the computerized platform, a set of digital certificates used by the network services, and a set of certificate revocation lists, each one of the network services requiring that at least one of the digital certificates in the set of digital certificates be maintained on the computerized platform for the network service to perform secure communications over the communication network, and each one of the certificate revocation lists comprising a list of digital certificates that have been revoked; and managing, by the processing circuitry, and through a single access point on the computerized platform providing access to the certificate store, the set of digital certificates and the set of certificate revocation lists maintained in the certificate store, the single access point comprising an application programming interface that receives certificate commands from multiple components executing in the computerized platform, the multiple components executing in the computerized platform from which the certificate commands are received by the application programming interface including the set of network services installed on the computerized platform, certificate management graphical user interface logic that receives certificate commands from a graphical user interface displayed in a display device of the computerized platform, and certificate command-line interface logic that receives certificate commands from a command-line interface displayed in the display device of the computerized platform, the managing of the set of digital certificates and the set of certificate revocation lists through the single access point including:

assigning one or more tags to each digital certificate in the set of digital certificates, one of the tags assigned to each digital certificate comprising a service tag indicating at least one network service in the set of network services that uses the digital certificate to perform secure communications over the communication network using a communication protocol that is based on public-key cryptography, assigning one or more tags to each certificate revocation list in the set of certificate revocation lists, one of the tags assigned to each certificate revocation list comprising a service tag indicating at least one network service in the set of network services that uses the certification revocation list, performing a set of certificate management operations on the digital certificates, in response to receipt of corresponding commands from the multiple components through the application programming interface, at least one of the certificate management operations selecting a subset of the digital certificates from the set of digital certificates using at least one of the tags assigned to the digital certificates, and performing a set of certificate revocation list management operations through the single access point to the certificate store, at least one of the certificate revocation list management operations selecting a subset of the certificate revocation lists from the set of certificate revocation lists using at least one of the tags assigned to the certificate revocation lists.

2. The method of claim 1, wherein performing the certificate management operations includes receiving a query command specifying a network service and, in response to receiving the query command, performing a query operation that selects a subset of digital certificates consisting of digital certificates having service tags matching the network service specified by the query command.

3. The method of claim 2, wherein assigning the tags to each digital certificate includes assigning a certificate type tag to each digital certificate, the certificate type tag indicating a type of the digital certificate; and wherein performing the set of certificate management operations further includes receiving a query command specifying a certificate type and, in response to receiving the query command, performing a query operation that selects a subset of digital certificates consisting of digital certificates having certificate type tags matching the certificate type specified by the query command.

4. The method of claim 3, wherein assigning a certificate type tag to each digital certificate includes assigning a first certificate type value to digital certificates containing public keys of client entities;

wherein the certificate type specified by the query command comprises the first certificate type value; and wherein the subset of digital certificates consists of digital certificates containing public keys of client entities.

5. The method of claim 3, wherein assigning a certificate type tag to each digital certificate includes assigning a second certificate type value to digital certificates containing public keys of server entities;

wherein the certificate type specified by the query command comprises the second certificate type value; and wherein the subset of digital certificates consists of digital certificates containing public keys of server entities.

6. The method of claim 3, wherein assigning a certificate type tag to each digital certificate includes assigning a third certificate type value to digital certificates containing public keys of certificate authorities;

wherein the certificate type specified by the query command comprises the third certificate type value; and wherein the subset of digital certificates consists of digital certificates containing public keys of certificate authorities.

7. The method of claim 3, wherein assigning a certificate type tag to each digital certificate includes assigning a fourth certificate type value to digital certificates containing public keys of trusted peers;

wherein the certificate type specified by the query command comprises the fourth certificate type value; and wherein the subset of digital certificates consists of digital certificates containing public keys of trusted peers.

8. The method of claim 3, wherein assigning the tags to each digital certificate includes assigning a certificate scope tag to each digital certificate, the certificate scope tag indicating a scope of operation within which the digital certificate may be used; and wherein performing the set of certificate management operations further includes receiving a second query command indicating a certificate scope and, in response to receiving the second query command, performing a query operation that selects a second subset of digital certificates consisting of digital certificates having certificate scope tags matching the certificate scope indicated by the received query command.

9. The method of claim 8, wherein performing the set of certificate management operations further includes receiving an import certificate command indicating a digital certificate and a set of tags, and, in response to receiving the import certificate command, performing an import certificate operation, wherein the import certificate operation stores the digital certificate indicated by the import certificate command into the certificate store and assigns the set of tags indicated by the import certificate command to the digital certificate.

10. The method of claim 9, wherein performing the set of certificate management operations further includes receiving a create certificate command indicating at least a subject attribute, and in response to receiving the create certificate command, performing a create certificate operation, wherein the create certificate operation generates a public/private key pair and a certificate signing request including the generated public key and the subject attribute, wherein the certificate signing request causes a certificate authority to generate and digitally sign a digital certificate containing the public key, and wherein the subject attribute is returned from the certificate authority and stored into the certificate store.

11. The method of claim 10, wherein performing the set of certificate management operations further includes receiving an export certificate command indicating a digital certificate stored in the certificate store, and, in response to receiving the export certificate command, performing an export certificate operation, wherein the export certificate operation outputs a copy of the digital certificate indicated by the export certificate command.

12. The method of claim 11, wherein performing the set of certificate management operations further includes receiving a delete certificate command indicating a digital certificate stored in the certificate store, and, in response to receiving the delete certificate command, performing a delete certificate operation, wherein the delete certificate operation deletes all copies of the digital certificate indicated by the delete certificate command.

13. The method of claim 1, further comprising:
associating an expiration date attribute with each digital certificate, the expiration date attribute indicating a date at which the digital certificate expires;
wherein assigning the tags to each digital certificate includes assigning a service tag to the digital certificate indicating the service in the set of services that uses the digital certificate; and
wherein performing the certificate management operations includes receiving a query command specifying a service and an expiration date range, and, in response to receiving the query command, performing a query operation that selects a subset of digital certificates consisting of digital certificates having service tags matching the service specified by the query command and expiration date attributes indicating dates within the expiration date range.

14. The method of claim 1, wherein the certificate command-line interface logic further receives certificate commands from at least one system administration script stored in the computerized platform.

15. The method of claim 1, wherein the set of network services installed on the computerized platform includes virtual computer data storage software that provides at least one virtual volume storage object to at least one host computer.

16. The method of claim 1, wherein performing the certificate management operations includes receiving a query command specifying a network service and, in response to receiving the query command, performing a query operation that selects a subset of certificate revocation lists having service tags matching the network service specified by the query command.

17. The method of claim 1, wherein performing the set of certificate management operations further includes receiving an import certificate revocation list command indicating a certificate revocation list and a set of tags, and, in response to receiving the import certificate revocation list command, performing an import certificate revocation list operation, wherein the import certificate revocation list operation stores the certificate revocation list indicated by the import certificate revocation list into the certificate store and assigns the set of tags indicated by the import certificate revocation list command to the certificate revocation list.

18. A computer program product, comprising:
at least one non-transitory computer readable medium storing program code for managing digital certificates on a computerized platform, the program code, when executed by processing circuitry, causing the processing circuitry to:
install a set of network services on the computerized platform, each one of the network services in the set of network services comprising an application program executing in the computerized platform that performs secure communications over a communication network that is connected to the computerized platform,
maintain at least one certificate store configured and arranged to store digital certificates and certificate revocation lists in the computerized platform, a set of digital certificates used by the network services, and a set of certificate revocation lists, each one of the network services requiring that at least one of the digital certificates in the set of digital certificates be maintained on the computerized platform for the network service to perform secure communications over the communication network, and each one of the certificate revocation lists comprising a list of digital certificates that have been revoked, and
manage, through a single access point on the computerized platform providing access to the certificate store, the set of digital certificates and the set of certificate revocation lists maintained in the certificate store, the single access point comprising an application programming interface that receives certificate commands from multiple components executing in the computerized platform, the multiple components executing in the computerized platform from which the certificate commands are received by the application programming interface including the set of network services installed on the computerized platform, certificate management graphical user interface logic that receives certificate commands from a graphical user interface displayed in a display device of the computerized platform, and certificate command-line interface logic that receives certificate commands from a command-line interface displayed in the display device of the computerized platform, the set of digital certificates and the set of certificate revocation lists being managed through the single access point at least in part by:
assigning one or more tags to each digital certificate in the set of digital certificates, one of the tags assigned to each digital certificate indicating at least one network service in the set of network services that uses the digital certificate to perform secure communications over the communication network using a communication protocol that is based on public-key cryptography,
assigning one or more tags to each certificate revocation list in the set of certificate revocation lists, one of the tags assigned to each certificate revocation list comprising a service tag indicating at least one network service in the set of network services that uses the certification revocation list, performing a set of certificate management operations on the digital certificates, in response to receipt of corresponding commands from the multiple components through the application programming interface, at least one of the certificate management operations selecting a subset of the digital certificates from the set of digital certificates using at least one of the tags assigned to the digital certificates, and performing a set of certificate revocation list management operations through the single access point to the certificate store, at least one of the certificate revocation list management operations selecting a subset of the certificate revocation lists from the set of certificate revocation lists using at least one of the tags assigned to the certificate revocation lists.

19. A computerized platform, comprising:

processing circuitry;

a display device; and at least one memory having program code stored thereon for managing digital certificates on a computerized platform, wherein the program code, when executed by the processing circuitry, causes the processing circuitry to:

install a set of network services on the computerized platform, each one of the network services in the set of network services comprising an application program executing in the computerized platform that performs secure communications over a communication network that is connected to the computerized platform, maintain at least one certificate store configured and arranged to store digital certificates and certificate revocation lists in the computerized platform, a set of digital certificates used by the network services, and a set of certificate revocation lists, each one of the network services requiring that at least one of the digital certificates in the set of digital certificates be maintained on the computerized platform for the network service to perform secure communications over the communication network, and each one of the certificate revocation lists comprising a list of digital certificates that have been revoked, and manage, through a single access point on the computerized platform providing access to the certificate store, the set of digital certificates and the set of certificate revocation lists maintained in the certificate store, the single access point comprising an application programming interface that receives certificate commands from multiple components executing in the computerized platform, the multiple components executing in the computerized platform from which the certificate commands are received by the application programming interface including the set of network services installed on the computerized platform, certificate management graphical user interface logic that receives certificate commands from a graphical user interface displayed in the display device of the computerized platform, and certificate command-line interface logic that receives certificate commands from a command-line interface displayed in the display device of the computerized platform, the set of digital certificates and the set of certificate revocation lists being managed through the single access point at least in part by:

assigning one or more tags to each digital certificate in the set of digital certificates, one of the tags assigned to each digital certificate indicating at least one network service in the set of network services that uses the digital certificate to perform secure communications over the communication network using a communication protocol that is based on public-key cryptography, assigning one or more tags to each certificate revocation list in the set of certificate revocation lists, one of the tags assigned to each certificate revocation list comprising a service tag indicating at least one network service in the set of network services that uses the certification revocation list, performing a set of certificate management operations on the digital certificates, in response to receipt of corresponding commands from the multiple components through the application programming interface, at least one of the certificate management operations selecting a subset of the digital certificates from the set of digital certificates using at least one of the tags assigned to the digital certificates, and performing a set of certificate revocation list management operations through the single access point to the certificate store, at least one of the certificate revocation list management operations selecting a subset of the certificate revocation lists from the set of certificate revocation lists using at least one of the tags assigned to the certificate revocation lists.

* * * * *